United States Patent [19]
Higuchi et al.

[11] 4,107,385
[45] Aug. 15, 1978

[54] MAGNETIC RECORDING MEDIUM

[75] Inventors: Shigetaka Higuchi, Sendai; Masaatsu Iwasaki, Iwanuma; Shigeo Kimura, Sendai, all of Japan

[73] Assignee: Sony Corporation, Tokyo, Japan

[21] Appl. No.: 579,471

[22] Filed: May 21, 1975

Related U.S. Application Data

[63] Continuation-in-part of Ser. No. 387,591, Aug. 13, 1973, abandoned.

[30] Foreign Application Priority Data

Aug. 14, 1972 [JP] Japan .................................. 47-81265

[51] Int. Cl.$^2$ ............................................. H01F 10/02
[52] U.S. Cl. ................................... 428/412; 428/413; 428/425; 428/539; 428/900
[58] Field of Search ............................. 427/127–132; 428/538, 412, 413, 425, 539, 900

[56] References Cited

U.S. PATENT DOCUMENTS

| 3,398,011 | 8/1968 | Neirotti et al. | 427/130 |
| 3,852,314 | 12/1974 | Hamanaka | 260/486 |

Primary Examiner—Bernard D. Pianalto
Attorney, Agent, or Firm—Lewis H. Eslinger; Alvin Sinderbrand

[57] ABSTRACT

A magnetic recording medium comprising a base, for example, of a non-magnetic plastic resin, and a magnetic layer coated on the base and composed of a binder with a magnetic powder dispersed therein, is provided with a friction-reducing additive in the magnetic layer constituted by a boron compound obtained by the esterification of boric acid with a polyhydric alcohol having vicinal hydroxyl groups, such as, glycerin. The amount of such boron compound is from 1 to 15, and preferably, from 4 to 10 parts by weight for each 100 parts by weight of the binder. The preferred boron compounds are those including mono- or di-esters of a fatty acid with or without ethylene oxide.

13 Claims, 3 Drawing Figures

MAGNETIC RECORDING MEDIUM

CROSS REFERENCE TO RELATED APPLICATION

This application is a continuation-in-part of the co-pending U.S. Pat. application Ser. No. 387,591, filed Aug. 13, 1973 and now abandoned.

BACKGROUND OF THE INVENTION

1. Field of the Invention

This invention relates generally to a magnetic recording medium having a magnetic coating or layer on a non-magnetic base, for example, as in magnetic recording tape.

2. Description of the Prior Art

When a magnetic recording tape is used in a tape recorder, the speed at which the tape is driven relative to the magnetic head of the tape recorder is very high, for example, 19 to 38 cm/sec. Since the magnetic tape engages or contacts tape guide members and the like during its high speed movement, the useful life of the tape is inevitably shortened by the resulting abrasion. Further, due to the fact that existing magnetic tape is insufficiently lubricated, the magnetic head is severely abraded or worn by the contact of the tape therewith. Although many efforts have been made to improve the lubrication and wear-resistance of magnetic tape, magnetic tape that is sufficient in these characteristics has not been achieved heretofore.

In the prior art, graphite, molybdenum disulfide, castor oil, olive oil and the like have been used as lubricants for magnetic tape, but these substances do not afford long-lasting lubrication to the magnetic tape. It is also known that a certain silicon derivative has a desirable lubricating effect, but such silicon derivative has a so-called blooming phenomenon in which the surface of a magnetic layer containing the silicon derivative becomes rough and uneven and the magnetic powder sticks to and clogs the magnetic head and thereby deleteriously affects its sensitivity.

Further, it has been proposed, for example, in U.S. Pat. No. 3,492,235, issued Jan. 27, 1970, and having a common assignee herewith, to employ, as lubricants for magnetic tape, ester lubricants produced by reaction between a pure monobasic fatty acid or a mixture of two or more monobasic fatty acids containing from 2 to about 18 carbon atoms, and a monohydroxy aliphatic alcohol containing more than 14 carbon atoms. Such ester lubricants include stearyl butyrate, stearyl stearate and stearyl laurate, and are preferably used in combination with high molecular weight hydrocarbon lubricants, such as squalene, squalane, pristane and eicosane. However, the above ester lubricants, particularly when used alone in sufficient quantity to provide a suitably reduced coefficient of friction for the magnetic recording tape or other medium, also produce the undesirable blooming phenomenon and resulting head clogging.

OBJECTS AND SUMMARY OF THE INVENTION

It is an object of this invention to provide a magnetic recording medium which has superior lubricating or low-friction characteristics, as well as durability or wear-resistance.

It is another object to provide a magnetic recording medium, as aforesaid, which causes minimum wearing of a magnetic head.

It is a further object of this invention to provide a magnetic recording medium with a friction-reducing additive in its magnetic layer which does not produce the so-called blooming phenomenon. In accordance with this invention, the magnetic layer coated on the base of a magnetic recording medium is provided with a friction-reducing additive which is a boron compound obtained by the esterification of boric acid with a polyhydric alcohol having vicinal hydroxyl groups, that is, hydroxyl groups at neighboring positions. Preferably, the boron compound employed as a friction-reducing additive in accordance with this invention is an ester or di-ester of a fatty acid or of a fatty acid containing ethylene oxide.

DESCRIPTION OF THE PREFERRED EMBODIMENTS

Figure 1:
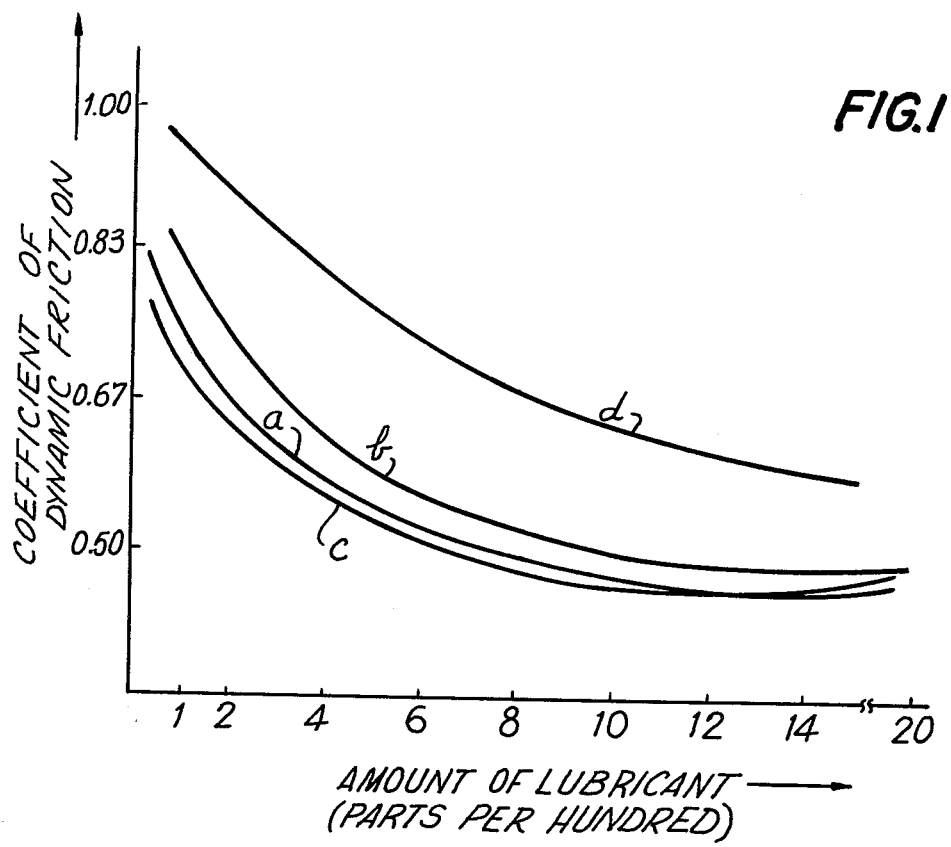
FIG. 1 is a graph showing the relationship between the coefficients of dynamic friction of magnetic tapes and the amounts of lubricants or friction-reducing additives included in the magnetic coatings of the tapes.

In accordance with this invention, a magnetic recording medium made up of a non-magnetic base coated with a magnetic layer or coating composed of a binder with a magnetic powder dispersed therein, is provided with a friction-reducing additive which is a boron compound, and more specifically a triester borate, obtained by the esterification of boric acid with a polyhydric alcohol having vicinal hydroxyl groups, that is, hydroxyl groups at neighboring positions, for example, as in the case of glycerin. Such boron compounds have the following structural formula:

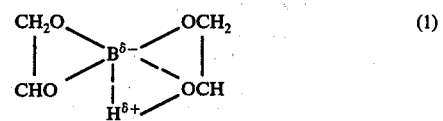

(1)

in which $B^{\delta-}$ represents a boron atom with a negative electric charge which has a feeble or low bonding force, and $H^{\delta+}$ represents a hydrogen atom with a positive electric charge which also has a feeble or low bonding force.

The preferred boron compounds used as friction-reducing additives in the magnetic coatings or magnetic recording tapes or other media in accordance with this invention are those including mono- or di-esters of a fatty acid, and which respectively have the below structural formulas (2) and (3); and those including mono- or di-esters of a fatty acid and containing ethylene oxide, and which respectively have the below structural formulas (4) and (5):

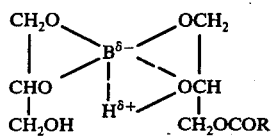

(2)

in which R represents an alkyl group containing from 7 to 21 carbon atoms,

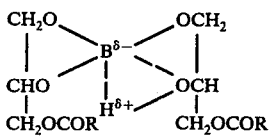

(3)

in which R has the meaning given above,

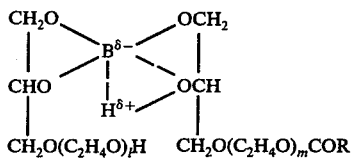

(4)

in which R has the meaning given above, each of l and m is a numerical value from 1 to 20 and the sum of l and m is no greater than 24,

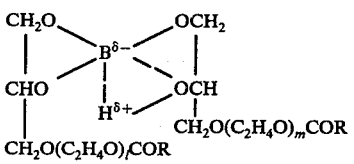

(5)

in which R, l and m have the meanings given above.

The boron compound is merely added or admixed with the other constituents of the magnetic coating material prior to the coating of the base therewith. The amount of the boron compound thus employed is from 1 to 15, and preferably from 4 to 10 parts by weight thereof, for each 100 parts by weight of the binder in the coating material.

The boron compounds employed as friction-reducing additives in the magnetic coating of magnetic recording tapes or other media according to this invention may be produced by known methods, for example, as disclosed in detail in French Pat. No. 2,025,541 to which British Pat. Specification No. 1,295,877 corresponds, and also in U.S. Pat. No. 3,852,314 issued Dec. 3, 1974. Further, many of the boron compounds that may be employed as friction-reducing additives according to this invention are commercially available from Toho Chemical Industry Co., Ltd., of Tokyo, Japan, under the tradename EMULBON.

Generally, in producing boron compounds having the above structural formulas (2) and (3), the triester borate may be first produced by esterification of boric acid with a polyhydric alcohol having vicinal hydroxyl groups, such as, glycerin. More specifically, the triester borate may be obtained by the dehydration of 3 mol $H_2O$ from 2 mol of glycerin and 1 mol of boric acid. The triester borate is then further esterified with a higher fatty acid to obtain the boron compounds having structural formulas (2) and (3).

Before the esterification of the triester borate with a higher fatty acid, ethylene oxide may be added to the triester borate so that the final boron compound will have structural formula (4) or (5) above. Alternatively, boron compounds having structural formulas (4) and (5) can be produced by esterification of boric acid, glycerin, and another polyhydric alcohol having vicinal hydroxyl groups and containing mono-ester of a higher fatty acid, such as, oleic acid mono-glycerin ester.

Among the boron compounds having structural formula (2) above, that is, including mono-esters of a fatty acid, that can be used as friction-reducing additives in the magnetic coatings of magnetic recording media according to this invention are, for example: glycerol borate laurate, which may be more precisely designated as (γ-lauroylglyceryl-α,β-glyceryl-α',β'-) boronium hydride; glycerol borate palmitate, which may be more precisely designated as (γ-palmitoylglyceryl-α,β-glyceryl-α',β'-) boronium hydride; glycerol borate stearate, which may be more precisely designated as (γ-stearoylglyceryl-α,β-glyceryl-α',β'-) boronium hydride; glycerol borate isostearate, which may be more precisely designated as (γ-isostearoylglyceryl-α,β-glyceryl-α',β'-) boronium hydride; and glycerol borate hydroxystearate, which may be more precisely designated as (γ-hydroxylstearoylglyceryl-α,β-glyceryl-α',β'-) boronium hydride.

Among the boron compounds having structural formula (3), that is, including di-esters of a fatty acid are, for example, glycerol borate di-oleate, which may be more precisely designated as bis-(γ-oleoylglyceryl-α,β-) boronium hydride; and glycerol borate di-stearate, which may be more precisely designated as bis (γ-stearoylglyceryl-α,β-) boronium hydride.

Among the boron compounds having structural formula (4), that is, containing a monoester of a fatty acid and ethylene oxide are, for example, polyoxyethylene glycerol borate laurate, which may be more precisely designated as (γ-lauroylpolyoxyethyleneglyceryl-α,β,γ'-polyoxyethyleneglyceryl-α',β'-) boronium hydride; polyoxyethylene glycerol borate palmitate, which may be more precisely designated as (γ-palmitoylpolyoxyethyleneglyceryl-α,β,γ'-polyoxyethyleneglyceryl-α',β'-) boronium hydride; polyoxyethylene glycerol borate stearate which may be more precisely designated as (γ-stearoylpolyoxyethylene glyceryl-α,β,γ'-polyoxyethyleneglyceryl-α',β'-) boronium hydride; polyoxyethylene glycerol borate olente, which may be more precisely designated as (γ-oleoylpolyoxyethylene-glyceryl-α,β,γ'-polyoxyethyleneglyceryl-α',β'-) boronium hydride; and a polyoxyethylene glycerol borate isostearate, which may be more precisely designated as (γ-isostearoylpolyoxyethyleneglyceryl-α,β,γ'-polyoxyethyleneglyceryl-α',β'-) boronium hydride.

Similar boron compounds having structural formula (5), that is, containing a di-ester of a fatty acid and ethylene oxide are, for example, polyoxyethylene glycerol borate di-stearate, which may be more precisely designated as bis-(γ-stearoylpolyoxyethyleneglyceryl-α,β-) boronium hydride; and polyoxyethylene glycerol borate di-oleate, with may be more precisely designated as bis-(γ-oleoylpolyoxyethyleneglyceryl-α,β-) boronium hydride.

As mentioned previously, from 1 to 15 parts by weight of any of the foregoing boron compounds is added to the magnetic coating material for each 100 parts by weight of the binder therein. If more than 15 parts by weight of the boron compound are added, the lubricating or friction-reducing effect thereof is saturated, that is, not further enhanced, and the blooming phenomenon appears. On the other hand, if less than 1 part by weight of the boron compound is employed, either no lubricating effect or an insufficient lubricating or friction reducing effect is achieved.

In a magnetic recording medium according to this invention, the binder of the magnetic coating material may be a thermoplastic resin, such as, for example, vinylchloride-vinylacetate copolymer resin, acrylic resin or the like, or a thermosetting resin, such as for example, phenol resin, epoxy resin, polyurethane resin or the like. The magnetic powder of the magnetic coating may be $\gamma$-$Fe_2O_3$, $Fe_3O_4$, Co-doped $\gamma$-$Fe_2O_3$, Co-doped $Fe_3O_4$, $CrO_2$ or mixtures thereof, or alloys of Fe-Co, Fe-Co-Ni and the like. The proportion of the magnetic powder in the magnetic coating is not critical and, as in conventional magnetic coatings for recording media, may, for example, be in the range from 200 to 600 parts by weight of magnetic powder for each 100 parts by weight of the binder.

The selected binder, magnetic powder and friction-reducing boron compound according to this invention are smoothly and uniformly mixed together, along with other conventional additives, and the resulting mixture is then coated on a suitable non-magnetic base, for example, of polyethylene terephthalate, a cellulose ester such as cellulose acetate or triacetate, polypropylene, polycarbonate or the like.

The invention will now be further illustrated with reference to the following specific examples:

EXAMPLE I

A magnetic paint or coating mixture is prepared by intimately mixing together the following constituents in the indicated proportions:

| | |
|---|---|
| $\gamma$-$Fe_2O_3$ | 350 weight parts |
| vinylchloride-vinylacetate copolymer resin | 60 weight parts |
| acrylonitrile-butadiene copolymer resin | 40 weight parts |
| lecithin | 6 weight parts |
| carbon | 6 weight parts |
| methyl ethyl ketone | 150 weight parts |
| cyclohexanone | 150 weight parts |

Into portions or samples of the above magnetic paint or coating mixture there were further mixed hereinafter specified amounts of a friction-reducing additive constituted by glycerol borate di-oleate, which may be more precisely designated as bis($\gamma$-oleoylglyceryl-$\alpha,\beta$-) boronium hydride, and which has the structural formula:

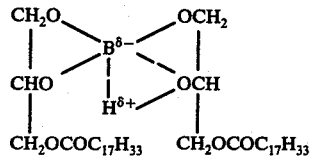

The above boron compound is available commercially from Toho Chemical Industry Co., Ltd., of Tokyo, Japan under the trade name "EMULBON S-83."

The amounts of glycerol borate di-oleate thus added were sufficient to provide 1,2,4,6,8,10,12,14 and 20 parts by weight thereof in the respective samples for each 100 parts by weight therein of the binder which is the aggregate of the vinylchloride-vinylacetate copolymer resin and the acrylonitrilebutadiene copolymer resin. Each of the thus formed samples of the magnetic paint was then conventionally coated on a base of polyethylene terephthalate which was cut to a suitable width to form a respective recording medium.

The coefficient of dynamic friction was measured for each recording medium, and the results thereof are shown by the curve $a$ on FIG. 1, in which the abscissa indicates the parts by weight of the friction-reducing additive for each 100 parts by weight of binder, and the ordinate indicates the coefficient of dynamic friction. It will be apparent from curve $a$ on FIG. 1 that, when using glycerol borate di-oleate as the lubricant or friction-reducing additive according to this invention, the coefficient of dynamic friction is very substantially lowered to within the range of about 0.75 to less than 0.50, respectively, when the amount of such additive is within the specified range of 1 to 15 parts thereof for each 100 parts by weight of the binder. Further, in the preferred range of 4 to 10 parts of the additive for each 100 parts by weight of the binder, the coefficient of dynamic friction is seen to be reduced to the range of from about 0.55 to less than 0.5, respectively.

Figure 2:
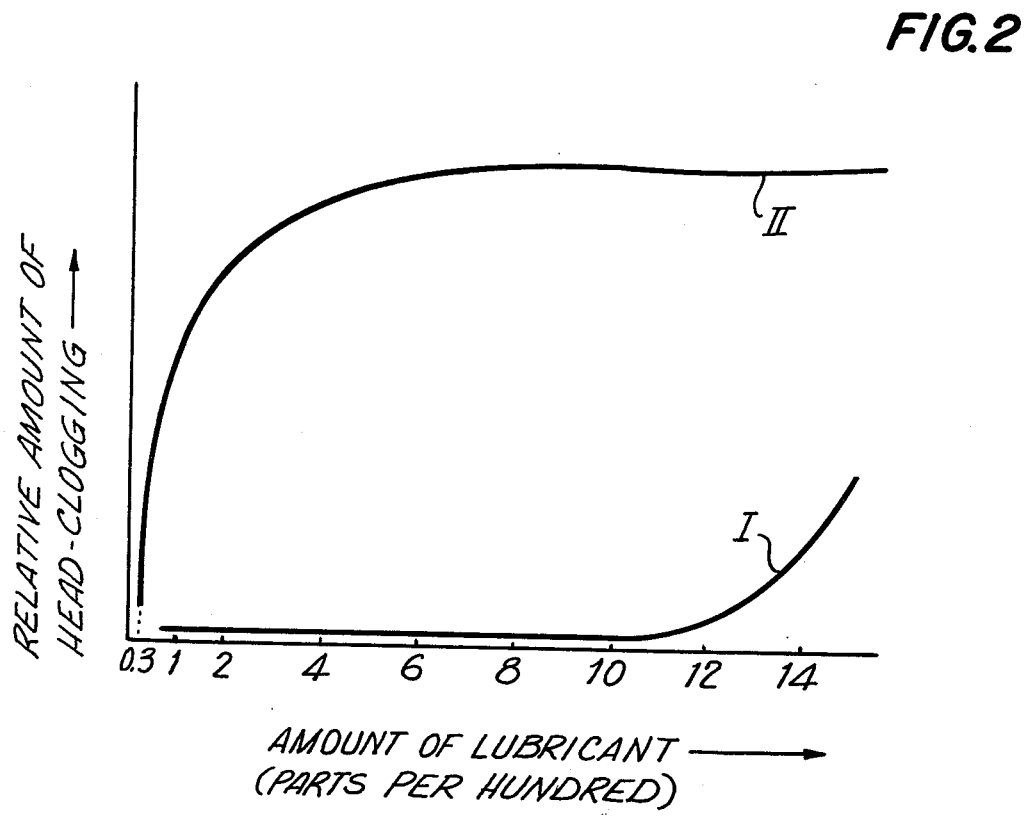
FIG. 2 is a graph showing the relationship between the head-clogging characteristics of magnetic tapes and the amounts of lubricants or friction-reducing additives included in the magnetic coatings of the tapes.

The clogging of a magnetic head, that is, the build-up of magnetic powder on the head due to the blooming phenomenon, was also measured for each recording medium and the results thereof are indicated by curve I on FIG. 2 in which the abscissa indicates the parts of the boron compound for each 100 parts by weight of the binder, and the ordinate indicates the degree of head clogging that results. It will be apparent from such curve I that, at least in the preferred range of 4 to 10 parts of the additive for each 100 parts by weight of the binder, the amount or degree of head clogging in insignificant, and that, even when the amount of the additive is increased to the upper limit of the broader specified range, that is, about 15 parts of the additive for 100 parts of the binder, the degree of head clogging is still not excessive.

EXAMPLE II

The procedures described in Example I were repeated, but with the friction-reducing additives employed in the magnetic coating or paint being polyoxyethylene glycerol borate di-oleate, which may be more precisely designated as bis-($\gamma$-oleoylpolyoxyethyleneglyceryl-$\alpha,\beta$-) boronium hydride, and which has the structural formula:

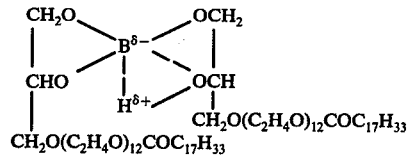

The above boron compound, which is available commercially from Toho Chemical Industry Co., Ltd., of Tokyo, Japan, under the trade name "EMULBON T-83", was again added to the respective samples of the magnetic paint or coating mixture in amounts sufficient to provide 1,2,4,6,8,10,12,14 and 20 parts by weight for each 100 parts by weight of the binder, respectively.

The various samples of this example were similarly tested for their coefficients of dynamic friction and the results thereof are indicated by the curve $b$ on FIG. 1. Further, head clogging tests with the several samples of this example, produced results similar to that indicated by curve I on FIG. 2.

EXAMPLE III

The procedures described in Example I were repeated, but with the addition to the magnetic paint or coating mixture of glycerol borate isostearate, which may be more precisely designated as (γ-isostearoyl-glyceryl-α,β-glyceryl-α',β'-) boronium hydride, and which has the structural formula:

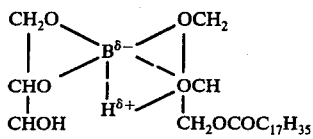

The above friction-reducing additive is available commercially from Toho Chemical Industry Co., Ltd. of Tokyo, Japan, under the tradename "EMULBON S-160", and was added to the magnetic paint or coating mixture in an amount sufficient to provide 6 parts by weight of such additive for each 100 parts by weight of the binder. The coefficient of dynamic friction for the resulting magnetic recording medium was determined to be 0.58, while the degree of head clogging by such magnetic recording medium was found to be substantially equal to that by the magnetic recording medium of Example I with the same amount of glycerol borate di-oleate as the friction-reducing additive.

EXAMPLE IV

The procedures described in Example I were repeated, but with the addition to the magnetic paint or coating mixture of polyoxyethylene glycerol borate stearate, which may be more precisely designated as (γ-stearoylpolyoxyethyleneglyceryl-α,β-polyoxyethyleneglyceryl-α',β'-) boronium hydride, and which has the structural formula:

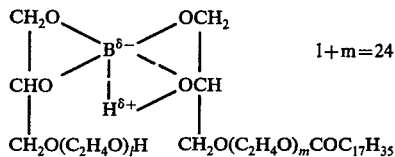

$l+m=24$

The above frction-reducing additive is available commercially from Toho Chemical Industry, Co., Ltd, of Tokyo, Japan, under the tradename "EMULBON T-160", and was added to the magnetic paint or coating mixture in an amount sufficient to provide 6 parts by weight of such additive for each 100 parts by weight of the binder. The coefficient of dynamic friction for the resulting magnetic recording medium was determined to be 0.57, while the degree of head clogging by such magnetic recording medium was again found to be substantially equal to that by the magnetic recording medium of Example I with the same amount of glycerol borate di-oleate as the friction-reducing additive.

COMPARATIVE EXAMPLES OF THE PRIOR ART

A. The procedures described in Example I were repeated, but with the stated amounts of dimethyl silicon being added to the magnetic paint or coating mixture as the lubricant or friction reducing additive. Testing of each magnetic recording medium for its coefficient of dynamic friction produced the results indicated by the curve c on FIG. 1, while the testing of each magnetic recording medium for head clogging produced the results indicated by the curve II on FIG. 2. From such curves c and II it will be seen that, although dimethyl silicon satisfactorily reduces the coefficient of dynamic friction of the magnetic recording medium when present in an amount providing at least 1 part by weight, and preferably at least 4 parts by weight, of the dimethyl silicon for each 100 parts by weight of the binder, an unacceptably high degree of head clogging occurs when the concentration of such lubricant exceeds 0.3 parts by weight of dimethyl silicon for each 100 parts of the binder. Conversely, if the amount of the dimethyl silicon is reduced to less than 0.3 parts thereof for each 100 parts by weight of the binder, the coefficient of dynamic friction is too high.

B. When the dimethyl silicon used in Comparative Example A was replaced by olive oil, the resulting magnetic recording media had the undesirably high coefficients of dynamic friction indicated by the curve d on FIG. 1. Further, even such relatively inadequate friction-reducing effect was found to be of undesirably short duration.

C. The procedures of Example I were repeated, but with stearyl stearate ester ($C_{17}H_{35}COOC_{17}H_{35}$) disclosed in U.S. Pat. No. 3,492,235 being added to two portions of the magnetic paint or coating mixture as the lubricant or friction-reducing additive in amounts sufficient to provide 2 and 6 parts by weight, respectively, of the stearyl stearate ester for each 100 parts by weight of the binder. Although the resulting magnetic recording media were found to have acceptably low coefficients of dynamic friction of 0.66 and 0.55, respectively, the degrees of head clogging by such magnetic recording media were found to be equivalent to that in the case of the use of dimethyl silicon (curve II on FIG. 2), and hence were intolerably high.

In the foregoing Examples I-IV of the invention and the comparative examples A, B and C of the prior art, the coefficient of dynamic friction and the degree of head clogging were measured by the following methods:

(A) COEFFICIENT OF DYNAMIC FRICTION.

Figure 3:
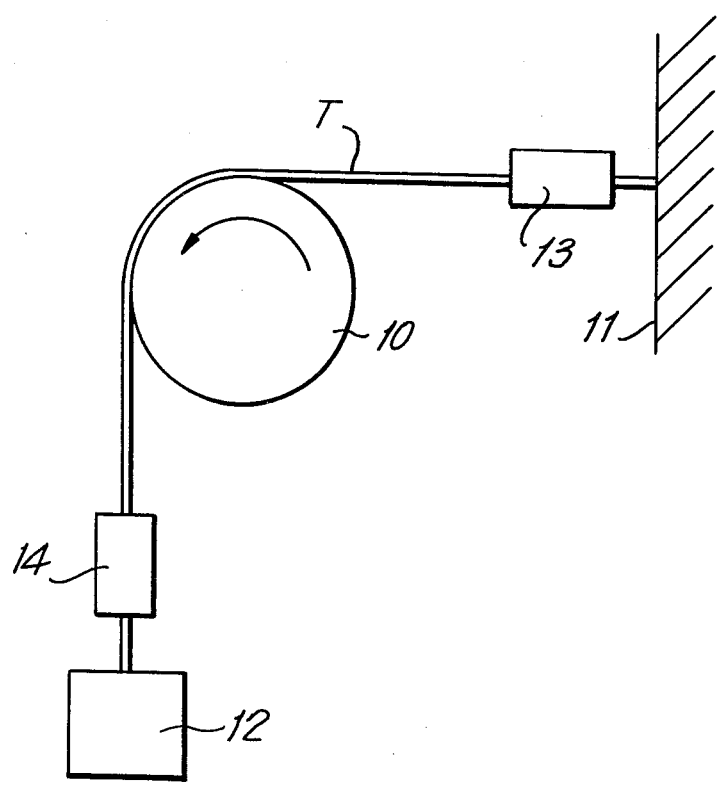
FIG. 3 is a schematic illustration of an apparatus used for determining the coefficients of dynamic friction of the tapes.

As shown on FIG. 3, an apparatus used for measuring the coefficient of dynamic friction of each tape T includes a drum 10 of ferrite having a diameter of 30 cm and being mounted for rotation about its axis which extends horizontally. The tape T is secured at one end to a suitable anchor 11 and extends horizontally from the latter about the drum 10 to a weight 12 of 100 grams which is suspended from the other end of the tape. Of course, the tape T is arranged so that its coated surface contacts the periphery of drum 10. Finally, tension meters, for example, in the form of strain gauges 13 and 14 are applied to the horizontal and vertical runs of tape T extending from the surface of drum 10 to the anchor 11 and the weight 12, respectively. In conducting the measurement of the coefficient of dynamic friction, the drum 10 is rotated for 120 seconds at a peripheral speed of 19.0 cm/sec., while the resulting tensions $T_1$ and $T_2$ in the horizontal and vertical runs of the tape are measured by strain gauges 13 and 14, respectively. Having obtained the values of tensions $T_1$ and $T_2$, the dynamic friction coefficient $\mu$ was calculated by means of the following equation:

$$\mu = \frac{2}{\pi} \log_e \frac{T_2}{T_1}$$

(B) HEAD CLOGGING.

Each of the tapes, which was wound on a 7 inch reel, was driven 20 times through a tape recorder at a speed of 19 cm/sec relative to the magnetic heads, under the condition of 45° C and 80% moisture, and also under the condition of 20° C and 60~70% moisture. After each tape was run 20 times, the recording, reproducing and erasing heads of the recorder were cleaned with a gauze impregnated with alcohol. The head clogging was evaluated in each instance by the amount of powders attached to the gauze.

It will be apparent from the foregoing that when the lubricants or friction-reducing additives of the prior art, such as, dimethyl-silicon or stearyl stearate ester, are used in sufficient quantities to effectively reduce the coefficient of dynamic friction of the resulting magnetic recording media, the blooming phenomenon and consequent head clogging is encountered. On the other hand, magnetic recording media containing the specified boron compounds as friction-reducing additives in the magnetic coating can employ amounts of such additives sufficient to provide effective lubrication for avoiding wear of the tape and/or the magnetic head, without build-up of powder or clogging of the head.

Although specific examples of the invention have been given herein, it is apparent that the invention is not limited to those precise examples, and that variations and modifications can be effected therein by one skilled in the art without departing from the scope or spirit of the invention as defined in the appended claims.

What is claimed is:

1. A magnetic recording medium comprising a base, and a magnetic layer coated on the base and consisting essentially of a binder and a magnetic powder and, in admixture therewith, for each 100 parts by weight of said binder, from 1 to 15 parts by weight of a friction-reducing additive selected from the boron compounds having any one of the following structural formulas:

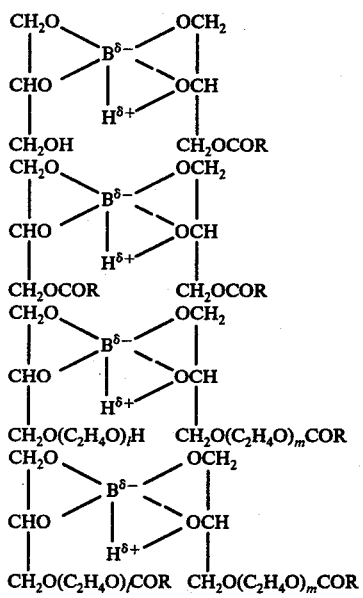

in which $B^{\delta-}$ represents a boron atom with a negative electric charge which has a low bonding force, $H^{\delta+}$ represents a hydrogen atom with a positive electric charge which also has a low bonding force, R represents an alkyl group containing from 7 to 21 carbon atoms, each of $l$ and m is a numerical value from 1 to 20 and the sum of the numerical values of $l$ and m is no greater than 24.

2. A magnetic recording medium as in claim 1, in which said magnetic powder is $\gamma\text{-Fe}_2\text{O}_3$.

3. A magnetic recording medium as in claim 1, in which said magnetic powder is Co-doped $\gamma\text{-Fe}_2\text{O}_3$.

4. A magnetic recording medium as in claim 1, in which said magnetic powder is $\text{CrO}_2$.

5. A magnetic recording medium as in claim 1, in which said magnetic powder is a mixture of Co-doped $\text{Fe}_3\text{O}_4$ and $\text{CrO}_2$.

6. A magnetic recording medium as in claim 1, in which said base is of a plastic resin selected from the group consisting of polyethylene terephthalate, cellulose acetate or triacetate, polypropylene and polycarbonate.

7. A magnetic recording medium as in claim 1, in which said binder is selected from the group consisting of vinylchloride-vinylacetate copolymer, acrylic, phenol, epoxy and polyurethane resins.

8. A magnetic recording medium as in claim 1, in which said boron compound is glycerol borate di-oleate.

9. A magnetic recording medium as in claim 1, in which said boron compound is polyoxyethylene glycerol borate di-oleate.

10. A magnetic recording medium as in claim 1, in which there are from 4 to 10 parts by weight of said boron compound for each 100 parts by weight of said binder.

11. A magnetic recording medium as in claim 1, in which said boron compound is glycerol borate isostearate.

12. A magnetic recording medium as in claim 1, in which said boron compound is polyoxyethylene glycerol borate stearate.

13. A magnetic recording medium as in claim 1, in which said boron compound is selected from the group consisting of ($\gamma$-lauroylglyceryl-$\alpha,\beta$-glyceryl-$\alpha',\beta'$-) boronium hydride;

($\gamma$-palmitoylglyceryl-$\alpha,\beta$-glyceryl-$\alpha',\beta'$-) boronium hydride;

($\gamma$-stearoylglyceryl-$\alpha,\beta$-glyceryl-$\alpha',\beta'$-) boronium hydride;

($\gamma$-isostearoylglyceryl-$\alpha,\beta$-glyceryl-$\alpha',\beta'$-) boronium hydride;

($\gamma$-hydroxylstearoylglyceryl-$\alpha,\beta$-glyceryl-$\alpha',\beta'$-) boronium hydride;

bis-($\gamma$-oleoylglyceryl-$\alpha,\beta$-) boronium hydride; bis ($\gamma$-stearoylglyceryl-$\alpha,\beta'$) boronium hydride; ($\gamma$-lauroylpolyoxyethyleneglyceryl-$\alpha,\beta,\gamma'$-polyoxyethyleneglyceryl-$\alpha',\beta'$-) boronium hydride;

($\gamma$-palmitoylpolyoxyethyleneglyceryl-$\alpha,\beta,\gamma'$-polyoxyethyleneglyceryl-$\alpha',\beta'$-) boronium hydride; ($\gamma$-stearoylpolyoxyethylene glyceryl-$\alpha,\beta,\gamma'$-polyoxyethyleneglyceryl-$\alpha',\beta'$-) boronium hydride;

($\gamma$-oleoylpolyoxyethyleneglyceryl-$\alpha,\beta,\gamma'$-polyoxyethyleneglyceryl-$\alpha',\beta'$-) boronium hydride; ($\gamma$-isostearoylpolyoxyethyleneglyceryl-$\alpha,\beta,\gamma'$-polyoxyethyleneglyceryl-$\alpha',\beta'$-) boronium hydride;

bis-($\gamma$-stearoylpolyoxyethyleneglyceryl-$\alpha,\beta$-) boronium hydride; and bis-($\gamma$-oleoylpolyoxyethyleneglyceryl-$\alpha,\beta$-) boronium hydride.

* * * * *